United States Patent
Armbruster et al.

(10) Patent No.: US 10,491,317 B2
(45) Date of Patent: Nov. 26, 2019

(54) METHOD FOR OPERATING A NETWORK ARRANGEMENT, NETWORK SYSTEM AND NETWORK ARRANGEMENT

(71) Applicant: Siemens Aktiengesellschaft, Munich (DE)

(72) Inventors: Michael Armbruster, Munich (DE); Ludger Fiege, Grafing (DE); Johannes Riedl, Ergolding (DE); Thomas Schmid, Nurtingen (DE); Andreas Zirkler, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 13/919,744

(22) Filed: Jun. 17, 2013

(65) Prior Publication Data

US 2013/0336338 A1    Dec. 19, 2013

(30) Foreign Application Priority Data

Jun. 15, 2012   (DE) .................... 10 2012 210 126

(51) Int. Cl.
*H04L 12/851*   (2013.01)
*H04W 28/02*   (2009.01)
(Continued)

(52) U.S. Cl.
CPC ............ *H04J 3/0647* (2013.01); *H04L 12/43* (2013.01)

(58) Field of Classification Search
CPC . H04L 12/43; H04L 2012/5651; H04L 45/34; H04W 72/1231
(Continued)

(56) References Cited

U.S. PATENT DOCUMENTS 7,464,180 B1 * 12/2008 Jacobs ................ H04L 47/2441
                                                               370/395.42
8,861,485 B2   10/2014 Gessner et al. ............... 370/336
(Continued)

FOREIGN PATENT DOCUMENTS

CN          1642145 A     7/2005   ........... H04L 12/741
CN          1878167 A    12/2006   ........... H04L 12/723
(Continued)

OTHER PUBLICATIONS

Gunzinger, David et al., "Optimising PROFINET IRT for Fast Cycle Times: a Proof of Concept," 8th IEEE Conference on Factory Communication Systems, XP031732754, 8 pages, May 18, 2010.
(Continued)

*Primary Examiner* — Khaled M Kassim
*Assistant Examiner* — Jason A Harley
(74) *Attorney, Agent, or Firm* — Slayden Grubert Beard PLLC (57) ABSTRACT

A method for operating a network arrangement having a plurality of network systems is disclosed. Data belonging to a first class is synchronously transmitted in a specified time slot identical for all network systems. A network system, which owing to a synchronization error during the specified time slot, receives data belonging to other classes from a plurality of senders, then only sends data belonging to the first class, but now in standard messages belonging to class 2. Non-vital data belonging to the other classes is no longer transmitted in this operating state. Improved failure safety and in particular a fail-operational mode is provided by the behavior of the network systems in the event of synchronization errors. A network system which implements the method and a network arrangement having a plurality of corresponding network systems is also proposed.

17 Claims, 3 Drawing Sheets

(51) Int. Cl.
*H04M 3/56* (2006.01)
*G06F 9/44* (2018.01)
*H04J 3/06* (2006.01)
*H04L 12/43* (2006.01)

(58) Field of Classification Search
USPC .......................................................... 370/443
See application file for complete search history.

(56) References Cited

U.S. PATENT DOCUMENTS

| | | | | |
|---|---|---|---|---|
| 2002/0150055 | A1* | 10/2002 | Tatsumi | 370/255 |
| 2005/0058151 | A1* | 3/2005 | Yeh | H04W 52/46 |
| | | | | 370/445 |
| 2008/0123682 | A1* | 5/2008 | Yackoski | H04L 45/34 |
| | | | | 370/443 |
| 2008/0232344 | A1* | 9/2008 | Basu et al. | 370/350 |
| 2010/0131686 | A1* | 5/2010 | Korrek | 710/105 |
| 2011/0200051 | A1* | 8/2011 | Rivaud | H04J 3/0641 |
| | | | | 370/400 |
| 2012/0083264 | A1* | 4/2012 | Ramasamy | H04W 52/262 |
| | | | | 455/425 |
| 2013/0279393 | A1* | 10/2013 | Rubin | H04J 3/1694 |
| | | | | 370/312 |

FOREIGN PATENT DOCUMENTS

| | | | | |
|---|---|---|---|---|
| CN | 101933352 A | 12/2010 | ............ | H04W 16/10 |
| CN | 102404226 A | 4/2012 | ............ | H04L 12/865 |
| DE | 102006021930 A1 | 11/2007 | ............ | H04L 12/56 |
| DE | 102010027167 A1 | 1/2012 | ............ | H04L 12/413 |
| EP | 2410697 A1 | 1/2012 | ............ | H04L 12/40 |

OTHER PUBLICATIONS

Chinese Office Action, Application No. 201310234962.9, 12 pages, dated Aug. 5, 2015.
Chinese Office Action, Application No. 201310234962.9, 13 pages, dated Feb. 15, 2016.
Chinese Office Action, Application No. 201310234962.9, 8 pages, dated Jan. 25, 2017.

* cited by examiner

METHOD FOR OPERATING A NETWORK ARRANGEMENT, NETWORK SYSTEM AND NETWORK ARRANGEMENT

CROSS-REFERENCE TO RELATED APPLICATIONS

This application claims priority to DE Patent Application No. 10 2012 210 126.8 filed Jun. 15, 2012. The contents of which is incorporated herein by reference in its entirety.

TECHNICAL FIELD

The present disclosure relates to a method for operating a network arrangement having network systems. Network systems or network nodes are installed in communications networks and can generate and process sensor data or control data by way of example.

BACKGROUND

In the case of networks which are particularly relevant to safety, such as in automation plants or latterly also applications in the automotive sector by way of example, data which is particularly relevant to safety must continue to be transmitted even in the event of potential faults in hardware components or transmission paths.

Synchronized communications systems by way of example are used in real-time systems and these employ for example AFDX (Avionics Full Duplex Switched Ethernet), TTEthernet in the case of aircraft applications or for example Profinet IRT (Isochronous Real Time) in automation networks. High priority data is exchanged between the network nodes in a specified time slot. Highly accurate synchronization of the network users among themselves is necessary. High priority messages are not dealt with either in the event of faulty synchronization and this can lead to failure of the communications system. Redundant communications systems having different synchronization mechanisms are often used to prevent corresponding synchronization errors and provide a secure network. This leads to usually increased cabling and hardware expenditure.

In this respect it is desirable to provide, in particular for network applications relevant to safety, network operation and network systems which reliably perform their task even in the event of synchronization difficulties.

SUMMARY

One embodiment provides a method for operating a network arrangement having a plurality of network systems, which are communicatively coupled to each other, wherein data belonging to a first class is transmitted in at least one specified time slot identical for all network systems, and at least one network system, which during the specified time slot receives data belonging to other classes at least temporarily sends or forwards only data belonging to the first class.

In a further embodiment, the data belonging to the first class is synchronously transmitted between the network systems during the specified time slot.

In a further embodiment, the data belonging to the first class is transmitted only during the specified time slot.

In a further embodiment, the specified data belonging to the first class is provided with a class mark, in particular according to an IEEE 802.1p standard.

In a further embodiment, the method further comprises: in at least one network system, checking as to whether data other than that belonging to the first class arrives during the specified time slot.

In a further embodiment, the method further comprises: in at least one network system, if in a period of the specified time slot more than a specified number of data other than data belonging to the first class, in particular from different network systems, is received, blocking forwarding of the other data and sending only data belonging to the first class.

In a further embodiment, the step of checking, blocking and sending is carried out in all network systems.

In a further embodiment, the method further comprises: in at least one network system, checking/monitoring whether data belonging to the first class is being synchronously received from an adjacent network system, and if data belonging to the first class does not synchronously arrive from a single adjacent network system, classifying the adjacent network system as faulty.

In a further embodiment, the step of checking and classifying is carried out in all network system.

In a further embodiment, the method further comprises: sending synchronization messages for aligning the specified time slot in all network systems.

In a further embodiment, data belonging to other classes is transmitted outside of the specified time slot according to Ethernet scheduling.

Another embodiment provides a computer program product which prompts the execution of any of the methods disclosed above on one or more program-controlled systems.

Another embodiment provides a network system which is configured to carry out any of the methods disclosed above.

In a further embodiment, data the network arrangement comprising a plurality of network systems, which are in particular annularly communicatively coupled to each other, wherein the network systems which is configured to carry out any of the methods disclosed above.

In a further embodiment, network systems are sensor systems or actuator systems for operating a vehicle.

BRIEF DESCRIPTION OF THE DRAWINGS

Exemplary embodiments will be explained in more detail below on the basis of the schematic drawings, wherein.

DETAILED DESCRIPTION

Embodiments of the present invention provide an improved method for operating a network arrangement, an improved network system and/or network arrangement.

For example, a method for operating a network arrangement is therefore proposed, having a plurality of network systems which are in particular annularly communicatively coupled to each other. Data belonging to a first class is transmitted in at least one specified time slot identical for all network systems. A network system, which during the specified time slot receives data belonging to other classes, at least temporarily, by way of example over a specified period, forwards or sends only data belonging to the first class.

In the case of full duplex communications systems, which are annularly designed, by way of example two possible communication paths result in the ring with opposing directions of communication. The data belonging to the first class, by way of example, i.e. data which is particularly relevant to safety, relating to vital functions in the network arrangement, is transmitted in the specified time slot. In other words, high priority data belonging to the first class is exchanged in the manner of time slicing or a round robin, wherein the time of arrival of corresponding data packets is synchronous in all network systems as far as possible. A dedicated communications path or transmitting channel is therefore kept free for the duration of the time slot, so a large amount of vital data or data belonging to the first class can be transmitted. Data are also called messages, data packets or frames, which carry data content.

Remaining data, which is not allocated to the first class, contains by way of example non-vital data which does not vitally affect the function of the network system or the network.

During the specified time slot the data belonging to the first class is preferably transmitted synchronously between the network systems. The specified data belonging to the first class can in particular be provided with a class mark, such as to an IEEE 802.1p standard by way of example. In this respect it is possible to detect on each network system that data belonging to the first class and other classes is arriving.

It can also be said that the network arrangement or the network systems are operated in a receiving mode, an error recovery mode or replacement mode if synchronization problems occur.

With the method only data belonging to the first class by way of example is in particular synchronously exchanged during the specified time slot.

Non-synchronous data transfers can also be carried out outside of the time slot. By way of example, data can then be transferred in accordance with conventional Ethernet scheduling. Known methods of clock recovery can be used for a synchronous transfer within the network, i.e. preferably on or in all network systems. In this connection it is conceivable for a single master clock or a global time to be set up.

The implementation of the network arrangement and the method for operating the same can occur in particular on the basis of a Profinet standard. Profinet (Process Field Network) is used in automation networks. Synchronous communications (IRT) by way of example are possible as a real-time data transfer, as is a data exchange in real time without synchronicity, and this is called RT. By way of example, according to a protocol for Profinet IO, an IRT transfer can be made during the specified time slot, whereas a simple RT protocol for Profinet CBA or Profinet IO is used in the other time domains.

In embodiments of the method synchronization messages for aligning the specified time slot and/or a clock are sent in all network systems.

If, by way of example, it is detected in a network system that data belonging to other classes is being received within the time slot it has detected, a synchronization disruption can be detected. This can be due to a global disruption or a local one in the individual network system. If the network system detects this, it at least temporarily sends only the data with the highest priority, i.e. belonging to the first class, in standard messages belonging to class 2. Temporarily can mean a specified programmable period. By way of example, data is transferred so as to differ from the synchronous transfer and from the regular time slot method until a repair to the synchronicity has been completed. This ensures that the high priority data belonging to the first class is received from the remaining network users, i.e. network systems or nodes, despite synchronization difficulties. This ensures that the vital data is reliably available in the network despite synchronization irregularities.

In some embodiments of the method, the method also comprises in at least one network system the step: checking or monitoring whether during the specified time slot data other than that belonging to the first class is arriving or being received. By way of example, the data packets provided with a mark in accordance with a specified standard can be classified in their class by the received network system. The method then preferably also comprises that in at least one network system, if in a period of the specified time slot more than a specified number of data other than data belonging to the first class is received, forwarding of the other data is blocked and only data belonging to the first class is sent.

Since in the case of synchronization disruptions the specified time slot at a faulty network system can be shifted with respect to the master clock and is therefore not synchronous with the remaining network systems present in the network arrangement, the network system which has detected that it is receiving inappropriate, i.e. data other than that belonging to the first class, during the time slot, flags or degrades itself by way of example. The affected network system can also be transferred into a mode in which it then receives, sends and forwards only the data belonging to the first class, although this is in standard messages belonging to class 2. The respective state of health, i.e. whether a network system reliably completes the envisaged synchronous transfers, which are provided according to a specified time slot method, of data belonging to different classes can be detected and provided in the network. The health data is stored in the network systems so as to be distributed for example.

The steps of checking or monitoring, blocking and sending are preferably carried out in all network systems of the network. For the case where all network systems provided in the network carry out this measure in the event of potential synchronization disruptions, a fail-operational mode results even in the case of disruptions because the transfer of vital data, which is allocated to the first class, then continues to occur from all network systems, although this is now in standard messages belonging to class 2. Non-vital data belonging to class 2 is no longer transmitted in this operating state. The transfer can occur in accordance with conventional Ethernet or Profinet scheduling methods.

Embodiments of the method may also include: in at least one network system, checking or monitoring whether data belonging to the first class is being synchronously received from an adjacent network system; and if data belonging to the first class does not synchronously arrive from an adjacent network system, in particular while data belonging to the first class synchronously arrives from other network systems, classifying the adjacent network system as faulty.

In the case of preferably synchronous transfer during the time slots for the high priority data a non-synchronous receipt of data belonging to the first class signalizes that a different network system is operating incorrectly by way of example. Checking all network systems, which are annularly arranged, the class membership of data received non-synchronously or synchronously, the respective faulty network system can be determined and categorized or classified accordingly. Appropriate error recovery measures can be initiated as a result.

It is also conceivable to provide different priorities or classes for the data. Depending on the load state of the network, data belonging to certain priority classes by way of example can also still be transmitted in the case of faulty synchronizations.

Checking or monitoring and classifying preferably occur as a function of a synchronous or non-synchronous receipt of data belonging to the first class in all network systems.

A network system is also proposed which is configured to carry out a method as described above.

The network system can by way of example be part of a field device for an automation network. It is also conceivable, however, for the network systems to be configured as a sensor system or actuator system for operating a vehicle.

In this connection the network system preferably comprises a controller, such as a microcontroller, and a switch mechanism which is suitable in particular for coupling to an Ethernet structure. An annular interconnection of corresponding network systems produces two annular communications paths with opposing directions. It is also possible to configure the network systems to be redundant, i.e. one network system then comprises a pair consisting of controller and switch mechanism respectively.

In embodiments of the network system the switch mechanism and/or microcontroller may be designed as a FPGA, ASIC, IC chip or hard-wired microcircuit.

The network system, which may also be called a network node or network element, has in particular two switch mechanisms which are constructed independently of each other and each switch for one ring direction. A CPU, microprocessor or even another programmable circuit by way of example may be considered as the controller. A sensor system can also be taken to mean a controller.

The network system may be configured in particular to work in accordance with an Ethernet protocol. Ethernet protocols are popular and may be flexibly implemented by way of example in automation networks and are even used latterly in vehicles. Corresponding communications networks and network systems, by way of example for controlling a motor, brake or other technical devices, which are provided in a vehicle, are conceivable.

A network arrangement is also proposed which comprises a plurality of network systems and which is configured to carry out a method as described above. The network systems have by way of example communications interfaces which are coupled to form a ring structure.

An Ethernet network is conceivable by way of example which is part of a motor vehicle. The network arrangement is suitable in particular for use in a vehicle, wherein the controllers are sensor and or actuator systems. Speed sensors, brake mechanisms or switch controllers are conceivable as sensor systems. Controllers are also conceivable which allow a drive-bywire. Overall a particularly reliable network arrangement results in which synchronization disruptions are reliably caught by communications channels. A fail-operational mode can be ensured by way of the specified error behavior when unexpected data is received.

A computer program product is also proposed which prompts the execution of the method as described above for operating a network arrangement on one or more program-controlled systems.

A computer program product such as a computer program means can be provided or supplied in a network by way of example as a storage medium, such as a memory card, USB stick, CD-ROM, DVD or even in the form of a file downloadable from a server. This can occur for example in a wireless communications network by way of the transfer of a corresponding file containing the computer program product or the computer program means. A network system as described above can in particular be considered as a program-controlled system.

Further possible implementations of the invention also include combinations of method steps, features or embodiments of the method, the network arrangement, network system or a network node described above or below in relation to the exemplary embodiments and which are not explicitly mentioned. The person skilled in the art will also add or modify individual aspects relating to the respective basic form of the invention as improvements or complements.

An embodiment of a network arrangement having a plurality of network systems, and a method for operating the same with an, in particular, synchronous exchange of data in a time slot method will be illustrated below.

Figure 1:
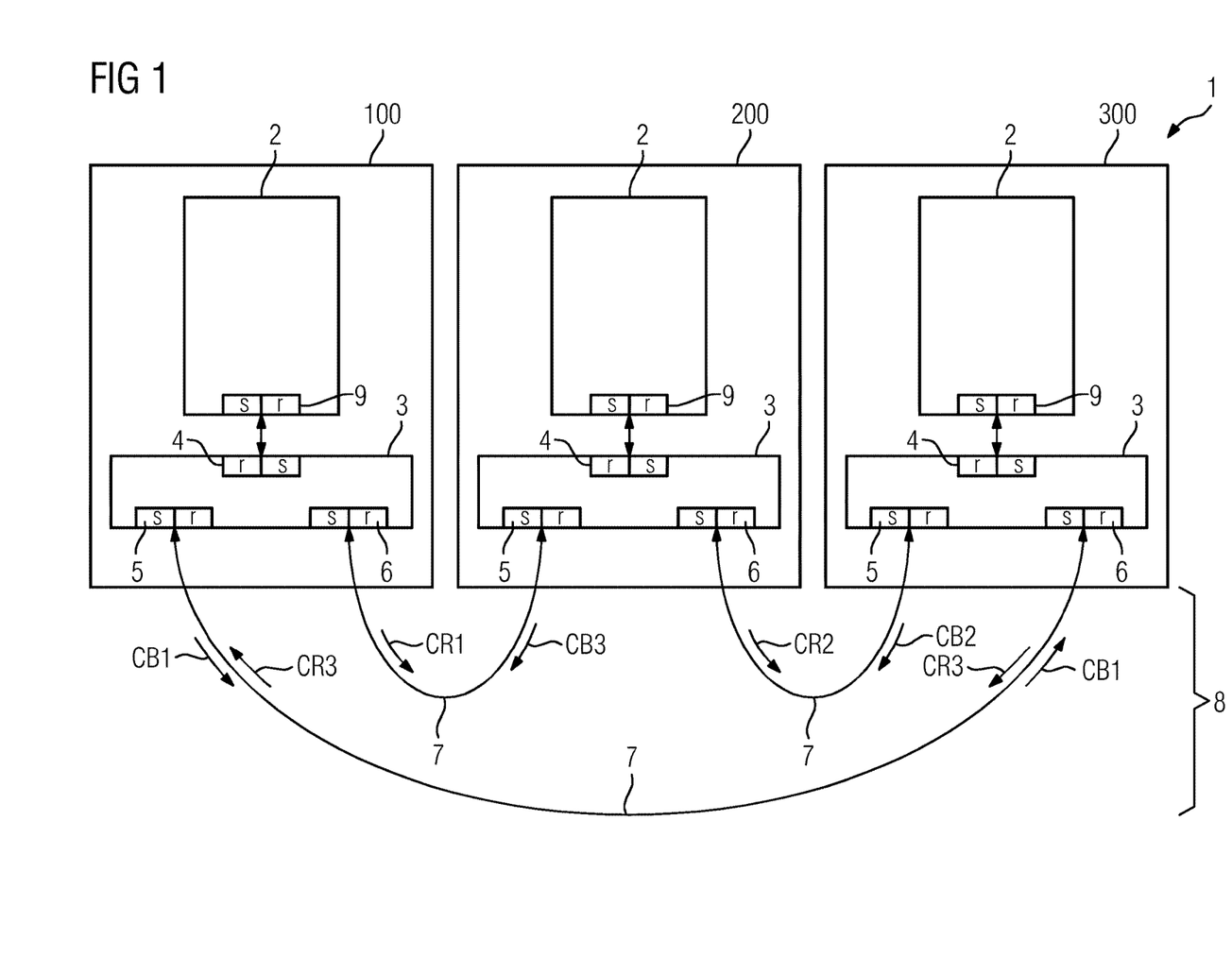
FIG. 1 shows a schematic diagram of an embodiment of a network arrangement for illustrating aspects of the method for operation thereof.

FIG. 1 shows a schematic view of a network arrangement which is configured by way of example for a Profinet standard. FIG. 1 shows a network arrangement 1 having three network systems 100, 200, 300. The network systems can be by way of example sensor or actuator systems or controllers for operation of a vehicle or other means of transport. Construction of an automation network having field devices as the network systems is also possible, however.

Each network system 100, 200, 300 has a controller 2 which is configured by way of example as a microcontroller or processor. One switch mechanism 3 respectively is also provided for coupling to the network infrastructure, by way of example cabling 8. The controller 2 has at least one port 9 which is suitable for coupling to a switch port 4. Only one port 9 is illustrated by way of example in each case, wherein data communication can also occur via a bus system or other internal means of communication. The port 9 is illustrated purely by way of example with one transmitting (S) and one receiving (R) connection respectively.

The switch mechanism 3 has further ports 5, 6 which are suitable for coupling to physical transmission medium, such as network cables 7. The three identically constructed network systems 100, 200, 300 are coupled to each other in a ring structure. A full duplex-capable transmission protocol, like Ethernet provides, can be used by way of example. Cables 7 are indicated by way of example which couple the three network systems 100, 200, 300 to the ports 5, 6 of the switch mechanisms 3 in a ring.

A first ring of, by way of example, transmission data is produced in particular in the case of full duplex communications protocols, and this runs in a first ring direction along the arrows CB1, CB2, CB3. This first communications path runs from switch port 5 of switch mechanism 3 of the first network system to switch port 6 of switch mechanism 3 of the third network system 300 (segment CB1), from switch port 5 of switch mechanism 3 of the third network system 300 to switch port 6 of switch mechanism 3 of the second network system 200 (segment CB2) and from switch port 5 of switch mechanism 3 of the second network system 200 to switch port 6 of switch mechanism 3 of the first network system (segment CB3). With this targeted communication the direction of communication via the data path can be counter-clockwise in the illustration of FIG. 1.

An opposing communications path comprising segments CR1, CR2, CR3 is analogously produced by way of the same cabling 7. The ring direction is the clockwise direction in the illustration of FIG. 1. Two separate communication paths may be created in this respect.

To securely and reliably distribute data which is particularly relevant to safety in the communications network 1, by way of example sensor data or control data for vital systems in a motor vehicle network, the network arrangement 1 is operated with time slicing. In other words, the data to be transmitted is allocated to classes and transmitted in the network at specified times. By way of example, there is a first class of data which is particularly relevant to safety. This data belonging to the first class must be reliably available at all network systems 100, 200, 300 even in the event of network problems. A synchronous data transfer of the important, vital data packets is completed in this respect for specified time slots ZS.

Synchronization can be achieved in the network in this connection by way of synchronization messages. It is conceivable for example for a clock master to be provided which specifies a clocking applicable to all network systems in the network 1. A clocking recovery can occur by way of example with the aid of the synchronization messages received at the respective receiving ports.

Figure 2:
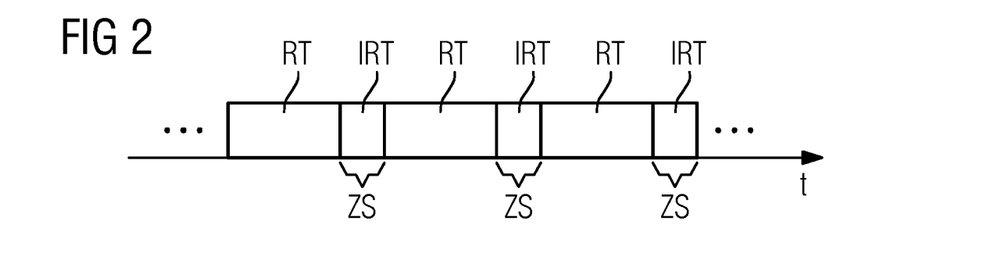
FIG. 2 shows a schematic diagram of time slice scheduling.
Figure 3:
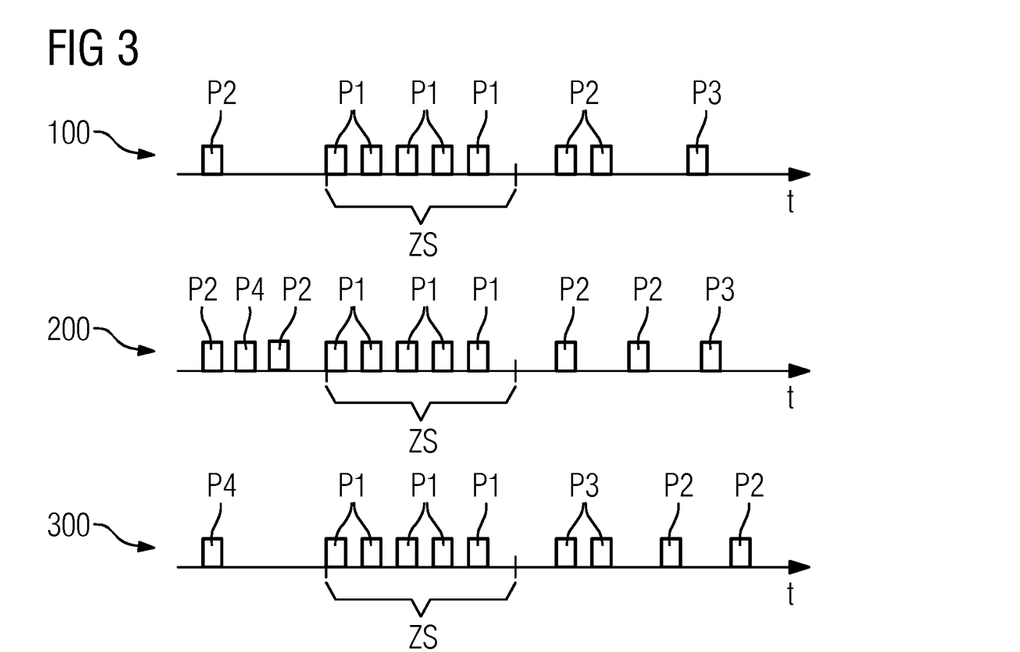
FIG. 3 shows a schematic diagram of synchronous data transfer of selected data.

FIG. 2 indicates time slice scheduling by way of example. The time is plotted on the axis t. Periods of time are provided in which, by way of example within the framework of a Profinet, real-time transfer RT is executed, and this does not necessarily occur synchronously. During specified time frames or time slots ZS the network systems 100, 200, 300 transmit the data belonging to the first class with the highest priority in a synchronous method, however. This may be the IRT protocol in particular when a Profinet protocol is used. The cycle times in Profinet environments for example are less than 1 ms for the clock. In this respect high priority data, by way of example vital control data for a drive-by-wire or particularly time-critical data packets, are allocated to the first class and distributed synchronously in the network 1 to the network systems 100, 200, 300. Other low class data, such as infotainment data by way of example, which is likewise transmitted via the network 1, can be transmitted during the remaining times in a normal real-time method or a best effort method. In the case of undisturbed synchronization, which is indicated in FIG. 3, the network system 100 (upper timeline) and the other network systems 200, 300 (lower timeline) by way of example send data packets P1 belonging to a first high priority class during the synchronous time frame ZS. It can be seen that the data packets P1 are synchronously available at the network systems 100, 200, 300. Data packets containing non-vital data or low class packets P2, P3, P4 can be transmitted in the remaining times. FIG. 3 shows by way of example in the upper timeline data packets P2 and P3 which are distributed asynchronously in the network outside of the time slot ZS. The lower timeline shows by way of example the sending and/or receiving of data packets P2, P4, P3 at the network systems 200, 300 outside of the time slot ZS. It is possible to divide the data P1 with the highest priority further. In other words, for example to allocate subclasses P1a, P1b, P1c, etc. as a function of the relevance to vital functions of the network 1.

Normal Ethernet scheduling by way of example is conceivable for the data packets in the times outside of the time slot. During operation of the network 1 the data packets are divided by way of example into priority levels or classes. A priority allocation to the IEEE 802.1p standard for example is suitable. The data belonging to the first class P1 and which is particularly relevant to safety is allocated to the PCP class (PCP=Priority Code Point) or level 7 for example. Other or different class assignments may also be made, however.

In principle disruptions can occur during the synchronization of network systems 100, 200, 300 among themselves, i.e. one or more of the network system(s) 100, 200, 300 are out of time. In order to nevertheless ensure fail-safe operation and in particular a fail-operational mode of the network 1 with the data relevant to safety and belonging to the first class, each network system 100, 200, 300 monitors whether data belonging to the first class P1 synchronously arrives in the time slot ZS specified for it and no data belonging to the first class P1 arrives outside of the time slot ZS. If at least one of these conditions for data from at least two different senders, i.e. network systems, is infringed, either the network system 100, 200, 300 itself may be incorrectly synchronized, or at least two other network systems 100, 200, 300 present in the network 1 are not correctly synchronized. In this case the conclusion may be drawn that it is not a single one of the other network systems which is the cause of the error but that either the cause of the error is local, i.e. the monitoring network system itself is defective, or synchronization is globally detective. One possibility of nevertheless sending the vital data P1 belonging to the first class onwards consists in that the network system 100, 200, 300, which has detected that incorrect, unexpected data belonging to other classes P1, P2, P3, P4 is being received, only deposits the vital data P1 in the network 1, but now in standard messages belonging to class 2. Non-vital data belonging to classes 2 to 4 is no longer transmitted in this operating state, which can also be called the receiving mode, error recovery mode or replacement mode.

Figure 4:
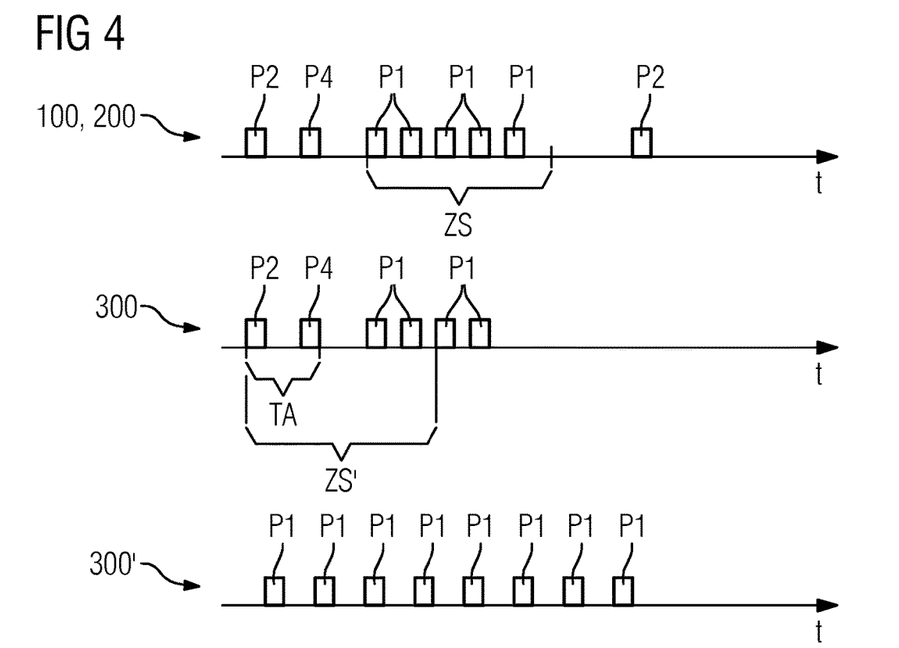
FIG. 4 shows a schematic diagram of disrupted synchronous data transfer on a network system.

In a particularly critical fault scenario all network systems 100, 200, 300 react accordingly, so the vital data traffic comprising data belonging to class P1 continues to be reliably completed. For the fault scenario where a network system, by way of example the network system 300, exhibits a synchronization defect, exemplary data transfers are indicated in FIG. 4 as a timeline. It is assumed that the network systems 100, 200, 300, as is indicated in FIG. 3, synchronously send data belonging to the first priority or class P1 during the time slot ZS, which is identical for all systems. Data with a different priority is not necessarily synchronously transmitted outside of the time slot.

If, accordingly, by way of example network system 300 has an incorrect synchronization, i.e. the time slot ZS' which it has detected is shifted with respect to the actual master clock time slot ZS, it receives unexpected data packets. This is indicated in the middle diagram in FIG. 4. In this respect network system 300 detects that during the time slot ZS', which is actually reserved for the synchronous distribution of priority data belonging to the first class, data P2, P4 belonging to other classes is also being received. By way of example it is measured on a respective network system 300 over specified periods TA how many data packets belonging to the first class arrive during the respective period TA and how many from the remaining classes. If the ratio exceeds a certain threshold of data from various sources, the corresponding network system 300 detects the error and switches into an error recovery mode. In the exemplary diagram in FIG. 4 network system 300 measures that per period TA two unexpected packets P2 and P4 arrive and not, as during a correctly synchronized time slot, only vital data P1. It is also possible that TA is as long as ZS and it is counted in a network system how many non-vital data packets arrive during the period of the (local) time slot ZS, ZS'. If a specified threshold is exceeded, an error recovery mode is initiated.

In the error recovery mode the network system 300', as indicated at the bottom of FIG. 4, sends only the vital data belonging to the first class P1. This occurs by way of example as a Profinet RT (class 2 packet) instead of the synchronous Profinet IRT packet. The adjacent network systems 100, 200 can then in particular detect that the network system 300 is not working synchronously and is only sending data P1 belonging to the first class. In other words, a corresponding classification or status information for the network system 300 can be held in readiness in the network 1.

As a measure the network system 300 is deactivated by way of example or it is then allocated only non-vital functions. In other words, since the synchronization at network system 300 is faulty, it is then only entrusted with functions which are described by data belonging to the remaining classes which are not of the highest priority.

It is also conceivable for the synchronization mechanism to have failed completely. In other words, none of the network systems can ensure a synchronous data transfer with each other. By way of example a synchronization master may fail or distribute synchronization information which has not be recognized as incorrect, or other systematic errors may occur in the network structure. In this case all network systems 100, 200, 300 detect that there is no synchronicity during the time slot, which they have detected locally, for the data P1 belonging to the first high priority class, for which reason each network system 100, 200, 300 will degrade itself and send only data belonging to the first class but now in standard messages for data belonging to class 2 or below. Non-vital data belonging to classes 2 to 4 is no longer transmitted in this operating state. By forgoing the transfer of non-vital data, the vital data is transported through the network within a deterministic time frame despite the incorrect synchronization.

In this error recovery mode the entire network can nevertheless forward and distribute the vital data belonging to the first priority class P1. Operation of the underlying system, by way of example of a vehicle, is still ensured therefore. It is also possible for a plurality of states of health to be allocated to the network systems. By way of example, a network system which has been recognized as being completely faulty and which can no longer complete any form of synchronization, is then only entrusted with data generation or forwarding, which uses low priority data, by way of example P4. Restricted functionality with respect to data generation and transfer is defined by way of example as a function of the state of health.

Overall, despite any desired network topology a reliable transfer of high-priority data, compared with data which has non-vital content, results owing to the suitable measures in the event of synchronization errors which may potentially occur. The proposed method and the network may be easily implemented and may be achieved in particular on the basis of Profinet protocols or even other Ethernet modifications.

Although the invention has been illustrated and described in detail by the preferred exemplary embodiment, the invention is not restricted by the disclosed examples, and the person skilled in the art can derive other variations herefrom without departing from the scope of the invention.

What is claimed is:

1. A method for operating a network arrangement having a plurality of network systems communicatively coupled to each other, comprising:
designating a first class of data;
specifying a first class time slot identical for each of the plurality of network systems;
instructing the plurality of network systems to transmit only data belonging to the first class in the specified first class time slot;
receiving data at one of the plurality network systems during the specified first class time slot, the data class belonging to a class other than the first class;
if one of the plurality of network systems receives data belonging to any class other than the first class during the specified first class time slot, blocking data from any class other than the first class and forwarding data belonging to the first class for a specified period of time, the first class data packaged in standard messages belonging to a second class;
in the one network system, checking whether data belonging to the first class is being synchronously received from an adjacent network system, and
if data belonging to the first class does not synchronously arrive to the one network system from a single adjacent network system, while first class data arrives from other network systems, classifying the single adjacent network system as faulty.

2. The method of claim 1, wherein the data belonging to the first class is synchronously transmitted between the network systems during the specified time slot.

3. The method of claim 1, wherein the specified data belonging to the first class is provided with a class mark according to an IEEE 802.1 p standard.

4. The method of claim 1, further comprising in at least one network system, checking whether data other than that belonging to the first class arrives during the specified time slot.

5. The method of claim 4, further comprising in at least one network system, if in a period of the specified time slot more than a specified number of data other than data belonging to the first class is received from different network systems, blocking forwarding of the other data and sending only data belonging to the first class.

6. The method of claim 5, comprising performing the steps of checking, blocking, and sending in all network systems.

7. The method of claim 1, comprising performing the steps of checking and classifying in all network system.

8. The method of claim 1, further comprising sending synchronization messages for aligning the specified time slot in all network systems.

9. The method of claim 1, wherein data belonging to other classes is transmitted outside of the specified time slot according to Ethernet scheduling.

10. A computer program product including computer instructions stored in non-transitory computer-readable media and executable by a processor to:
designate a first class of data;
specify a first class time slot identical for each of a plurality of network systems;
instructing the plurality of network systems to transmit only data belonging to the first class during the specified first class time slot;
receive data at one of the plurality network systems during the specified first class time slot, the data class belonging to a class other than the first class;
if one of the plurality of network systems receives data belonging to any class other than the first class during the specified time slot, blocking data from any class other than the first class and forwarding only the received data belonging to the first class for a specified period of time, the first class data packaged in standard message belonging to a second class;

in the network system, checking whether data belonging to the first class is being synchronously received from an adjacent network system, and if data belonging to the first class does not synchronously arrive from a single adjacent network system, while first class data arrives from other network systems, classifying the single adjacent network system as faulty.

11. A network arrangement comprising:

a plurality of network systems annularly communicatively coupled to each other, each of the network systems configured to transmit data belonging to a first class in a specified first class time slot identical for all network systems, the network systems are configured to transmit only data belonging to the first class during the specified first class time slot, and the network systems are configured to receive data at one of the plurality network systems during the specified first class time slot, the data class belonging to a class other than the first class;

wherein, if one network system of the plurality of network systems receives data belonging to any class other than the first class during the specified first class time slot, is configured to block data from any class other than the first class and forward data belonging to the first class for a specified period of time, the first class data packaged in standard messages belonging to a second class;

in the one network system, checking whether data belonging to the first class is being synchronously received from an adjacent network system, and if data belonging to the first class does not synchronously arrive from a single adjacent network system, while first class data arrives from other network systems, the adjacent network system is classified as faulty.

12. The network arrangement of claim 11, wherein the network systems comprises sensor systems for operating a vehicle.

13. The network arrangement of claim 11, wherein the network systems comprises actuator systems for operating a vehicle.

14. The network arrangement of claim 11, wherein the data belonging to the first class is synchronously transmitted between the network systems during the specified time slot.

15. The network arrangement of claim 11, wherein the specified data belonging to the first class is provided with a class mark according to an IEEE 802.1 p standard.

16. The network arrangement of claim 11, wherein at least one network system is configured to check whether data other than that belonging to the first class arrives during the specified time slot.

17. The network arrangement of claim 16, wherein at least one network system is configured to, if in a period of the specified time slot more than a specified number of data other than data belonging to the first class is received from different network systems, block forwarding of the other data and send only data belonging to the first class.

* * * * *